United States Patent
Labarthe et al.

(10) Patent No.: US 12,091,198 B2
(45) Date of Patent: Sep. 17, 2024

(54) DEPLOYMENT DEVICE

(71) Applicant: THALES, Courbevoie (FR)

(72) Inventors: Julien Labarthe, Cannes la Bocca (FR); Emmanuel Texier, Cannes la Bocca (FR)

(73) Assignee: THALES, Courbevoie (FR)

( * ) Notice: Subject to any disclaimer, the term of this patent is extended or adjusted under 35 U.S.C. 154(b) by 297 days.

(21) Appl. No.: 17/281,571

(22) PCT Filed: Sep. 30, 2019

(86) PCT No.: PCT/EP2019/076426
§ 371 (c)(1),
(2) Date: Mar. 30, 2021

(87) PCT Pub. No.: WO2020/070058
PCT Pub. Date: Apr. 9, 2020

(65) Prior Publication Data
US 2021/0387751 A1    Dec. 16, 2021

(30) Foreign Application Priority Data

Oct. 4, 2018 (FR) ..................................... 1801048

(51) Int. Cl.
*B64G 1/22* (2006.01)
*B64G 1/66* (2006.01)
*H01Q 1/28* (2006.01)

(52) U.S. Cl.
CPC .............. *B64G 1/222* (2013.01); *B64G 1/66* (2013.01); *H01Q 1/288* (2013.01)

(58) Field of Classification Search
CPC .......... B64G 1/222; B64G 1/66; H01Q 1/288; H01Q 1/08; H01Q 1/235
See application file for complete search history.

(56) References Cited

U.S. PATENT DOCUMENTS 4,562,441 A * 12/1985 Beretta ................. H01Q 1/288
343/781 P
5,509,747 A * 4/1996 Kiendl .................. F16H 37/126
244/172.6
(Continued)

FOREIGN PATENT DOCUMENTS

| EP | 0260442 A2 * | 3/1988 | |
| EP | 1189301 A2 * | 3/2002 | ............... H01Q 1/08 |

(Continued)

*Primary Examiner* — Joshua J Michener
*Assistant Examiner* — Ryan Andrew Yankey
(74) *Attorney, Agent, or Firm* — BakerHostetler

(57) ABSTRACT

A deployment device intended to be positioned on a bearing structure, includes a first instrument and a second instrument, a deployment mechanism comprising: a main arm connected to a face of the bearing structure at a first attachment point, on the one hand, and to the first instrument on the other hand, the second instrument being connected to the main arm, a main motor configured to actuate the main arm in relation to the face, a secondary motor configured to actuate the second instrument in relation to the main arm, and in that the two instruments are suitable for passing from a stored configuration, one over the other, on the face of the bearing structure, to a deployed configuration wherein the two instruments are at a distance from one another and from the bearing structure, and/or vice versa.

12 Claims, 7 Drawing Sheets

(56) References Cited

U.S. PATENT DOCUMENTS

| | | | | |
|---|---|---|---|---|
| 6,580,399 B1* | 6/2003 | Ballinger | H01Q 19/192 | |
| | | | 343/765 | |
| 6,983,914 B2* | 1/2006 | Stribling | B64G 1/443 | |
| | | | 244/172.8 | |
| 7,138,960 B2* | 11/2006 | Carroll | H01Q 1/288 | |
| | | | 343/915 | |
| 7,180,470 B1* | 2/2007 | Hentosh | H01Q 1/288 | |
| | | | 343/882 | |
| 7,598,922 B2* | 10/2009 | Brooks | B64G 1/222 | |
| | | | 343/DIG. 2 | |
| 8,487,830 B2* | 7/2013 | Texier | H01Q 1/1235 | |
| | | | 343/915 | |
| 8,659,493 B2* | 2/2014 | Bosshard | H01Q 3/20 | |
| | | | 343/839 | |
| 9,004,409 B1* | 4/2015 | Baghdasarian | B64G 1/66 | |
| | | | 244/172.6 | |
| 9,120,583 B1* | 9/2015 | Spence | B64G 1/222 | |
| 9,248,922 B1* | 2/2016 | Baghdasarian | B64G 1/222 | |
| 10,800,551 B2* | 10/2020 | Wu | B64G 1/66 | |
| 2007/0146227 A1* | 6/2007 | Brooks | B64G 1/66 | |
| | | | 343/DIG. 2 | |
| 2011/0147532 A1* | 6/2011 | Chaix | B64G 1/222 | |
| | | | 244/172.6 | |
| 2016/0264264 A1* | 9/2016 | Helmer | B64G 1/222 | |
| 2016/0311558 A1 | 10/2016 | Turse et al. | | |

FOREIGN PATENT DOCUMENTS

| | | |
|---|---|---|
| FR | 3 054 732 A1 | 2/2018 |
| WO | 2005/097595 A1 | 10/2005 |

* cited by examiner

DEPLOYMENT DEVICE

CROSS-REFERENCE TO RELATED APPLICATIONS

This application is a National Stage of International patent application PCT/EP2019/076426, filed on Sep. 30, 2019, which claims priority to foreign French patent application No. FR 1801048, filed on Oct. 4, 2018, the disclosures of which are incorporated by reference in their entirety.

FIELD OF THE INVENTION

The present invention relates to a device for deploying two instruments. It applies notably to the field of space equipment that has to be deployed in orbit and more particularly to space equipment for satellites, such as antennas, mirrors or other instruments. However, the invention applies to any other field in which it is desirable to deploy an assembly of at least two instruments from a supporting structure.

BACKGROUND

The invention is described in this patent application in the field of space, with as its main example instruments in the form of antennas since antennas are of particular relevance to the invention. Nonetheless, the invention may apply in similar fashion to other instruments and/or in a context other than space.

It is common practice to place antennas on a satellite in order to transmit bandwidth to Earth. The existing solutions consist in using a single or double stacking mechanism for stowing the antennas on the satellite and an assembly of arms with an assembly of motors assigned to each antenna for deploying each antenna. This limits the number of antennas on each face of the satellite. Furthermore, in order to be able to deploy multiple antennas, the prior art solutions involve a large number of arms and motors. This has negative consequences on the external configuration of the satellite and results in complex deployment kinematics. Finally, the fact of having to carry a large number of arms and motors also means that the mass of the assembly of mechanisms linked to the deployment of the antennas is high, which is not desirable.

SUMMARY OF THE INVENTION

The invention aims to remedy all or part of the above-mentioned problems by proposing a deployment device having the advantage of being compact, which makes it possible to save space and on-board mass on the satellite and to simplify the external configuration.

To that end, the invention relates to a deployment device designed to be positioned on a supporting structure, comprising:
- a first instrument and a second instrument,
- a deployment mechanism comprising:
  - a main arm connected to a face of the supporting structure at a first attachment point on one hand and to the first instrument on the other hand,
  - the second instrument being connected to the main arm,
  - a main motor configured to actuate the main arm relative to the face,
  - a secondary motor configured to actuate the second instrument relative to the main arm, the two instruments being able to pass from a stowed configuration, one on the other on the face of the supporting structure, to a deployed configuration in which the two instruments are remote from one another and from the supporting structure, and/or vice versa.

Advantageously, the deployment mechanism comprises a secondary arm connected to the main arm at a second attachment point on one hand and to the second instrument on the other hand.

Advantageously, the main motor is configured to actuate the main arm in rotation relative to the face of the supporting structure about a main axis of rotation.

Advantageously, the face of the supporting structure extends along a plane XY defined by a first axis X and by a second axis Y that is essentially perpendicular to the first axis X and the main axis is parallel to the plane XY.

Advantageously, the main axis intersects the plane XY.

Advantageously, the main axis is perpendicular to the plane XY.

According to one embodiment, N being an integer greater than or equal to 1, at least the main arm and/or the secondary arm if present is connected to the instrument to which the arm is connected by N arm sections and N motors, each one associated with an arm section and configured to actuate the associated arm section, so as to position the instrument to which said arm is connected relative to the other of the two instruments.

According to one embodiment of the invention, the instruments are antennas.

The invention also relates to a satellite comprising at least one deployment device as described in this application.

BRIEF DESCRIPTION OF THE DRAWINGS

The invention will be better understood and further advantages will become apparent upon reading the detailed description of one embodiment provided by way of example, which description is illustrated by the attached drawing, in which.

For the sake of clarity, the same elements will bear the same references in the various figures.

DETAILED DESCRIPTION

Figure 1:
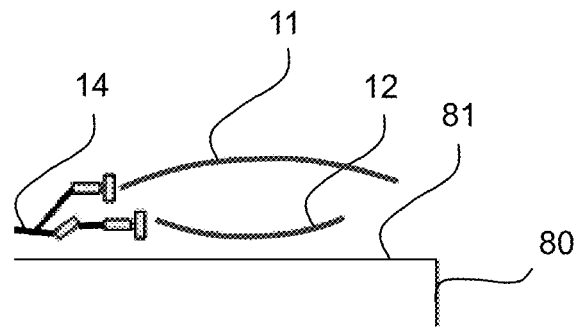
FIG. 1 schematically depicts a deployment device in the stowed configuration according to the invention, FIG. 2 schematically depicts a deployment device in the deployed configuration according to the invention, FIG. 3 schematically depicts a deployment device according to the invention, FIG. 4 schematically depicts a deployment device according to the invention in the stowed configuration, during deployment and in the deployed configuration, FIG. 5 schematically depicts a view from above of the face of the supporting structure on which rests an embodiment of the deployment device according to the invention, FIG. 6 schematically depicts a view from above of the face of the supporting structure on which rests another embodiment of the deployment device according to the invention, FIG. 7 schematically depicts another embodiment of a deployment device according to the invention in the deployed configuration, FIG. 8 schematically depicts a view of the deployment kinematics of two deployment devices according to the invention, FIG. 9 schematically depicts a satellite comprising at least one deployment device according to the invention.

FIG. 1 schematically depicts a deployment device 10 in the stowed configuration according to the invention. The deployment device 10 according to the invention is designed to be positioned on a supporting structure 80, for example a satellite. It comprises a first instrument 11 and a second instrument 12, for example antennas, and a deployment mechanism 13. The two instruments 11, 12 are able to pass from a stowed configuration, one on the other on the face 81 of the supporting structure 80 (as depicted in FIG. 1), to a deployed configuration in which the two instruments 11, 12 are remote from one another and from the supporting structure 80, and/or vice versa. In the stowed configuration, the instruments 11, 12 are one on the other. They may be laid one on the other with the face of one being in contact with a face of the other. However, they may equally be one above the other without physical contact between them. In addition, the instruments 11, 12 one on the other in the stowed configuration do not necessarily overlap entirely. One instrument may partially overlay the other instrument.

In the stowed configuration, the two antennas may be stowed facing toward one another or not. In other words, an active surface of one of the antennas may face an active surface or face an inactive surface of another antenna.

It should be noted that the invention is described with two antennas, but it is obvious that the same principle applies to three antennas, or more, these being superposed in the stowed position and deployed in a manner similar to that which will be explained below.

Figure 2:
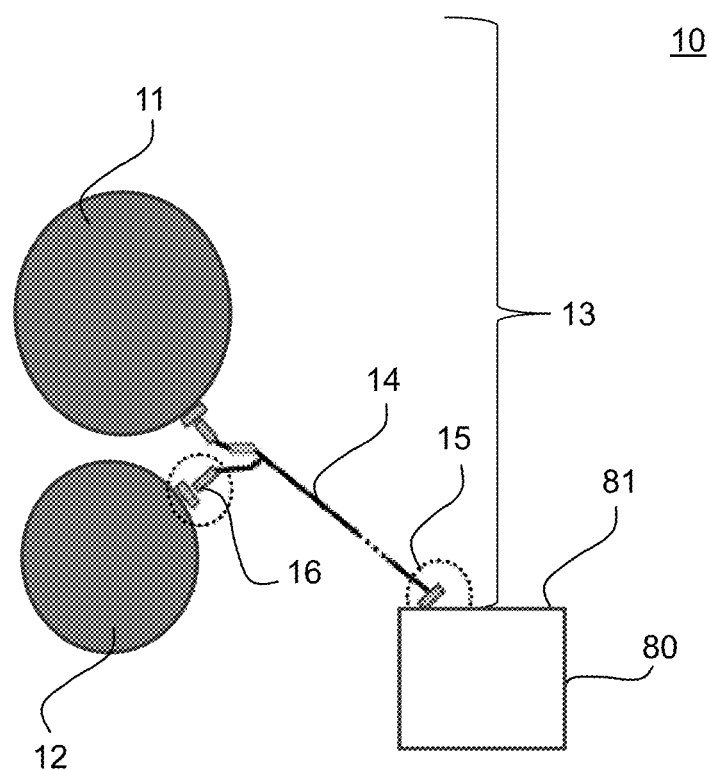

FIG. 2 schematically depicts the deployment device 10 in the deployed configuration according to the invention. The deployment mechanism 13 comprises a main arm 14 connected to a face 81 of the supporting structure 80 at a first attachment point 82 on one hand and to the first instrument 11 on the other hand. The second instrument 12 is connected to the main arm 14. It also comprises a main motor 15 configured to actuate the main arm 14 relative to the face 81, and a secondary motor 16 configured to actuate the second instrument 12 relative to the main arm 14. The main motor 15 is advantageously positioned at the first attachment point 82. The main motor 15 may be a single motor. The main motor 15 is to be understood as an assembly of motors, for example two motors, or three, depending on the actuation requirements. Thus, the deployment device according to the invention makes it possible to deploy two antennas using only two assemblies of motors (main motor and secondary motor) and a single arm.

Figure 3:
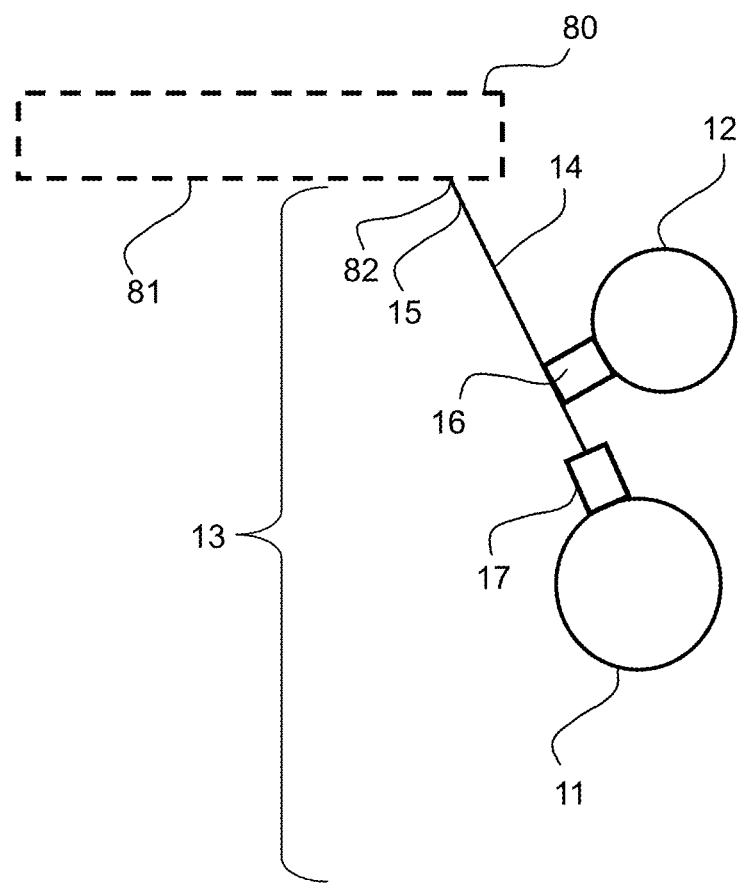

FIG. 3 schematically depicts the deployment device 10 according to the invention. The deployment device 10 may also comprise an additional motor 17 that serves for orienting the first instrument 11.

Figure 4A:
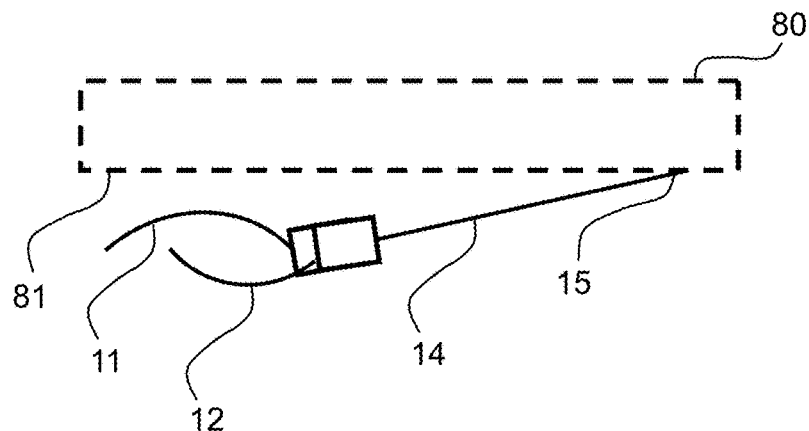
Figure 4B:
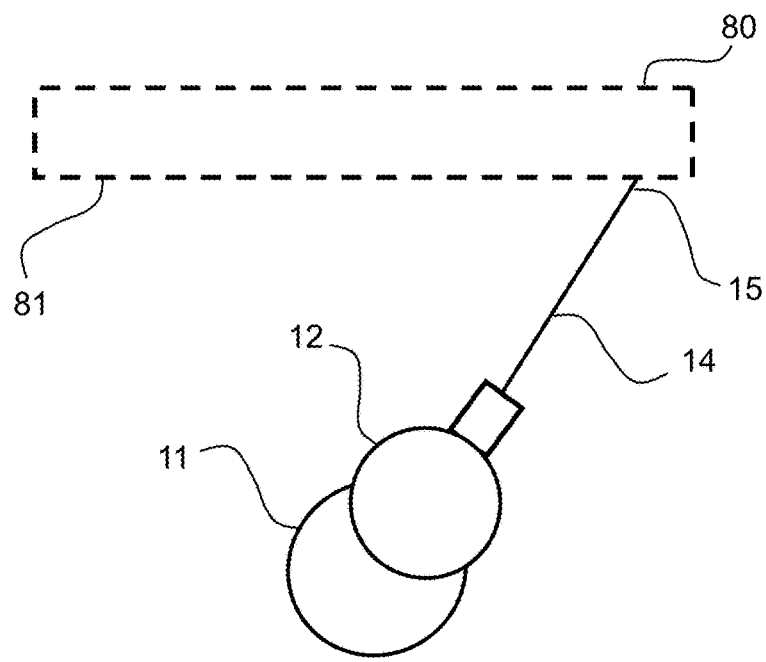
Figure 4C:
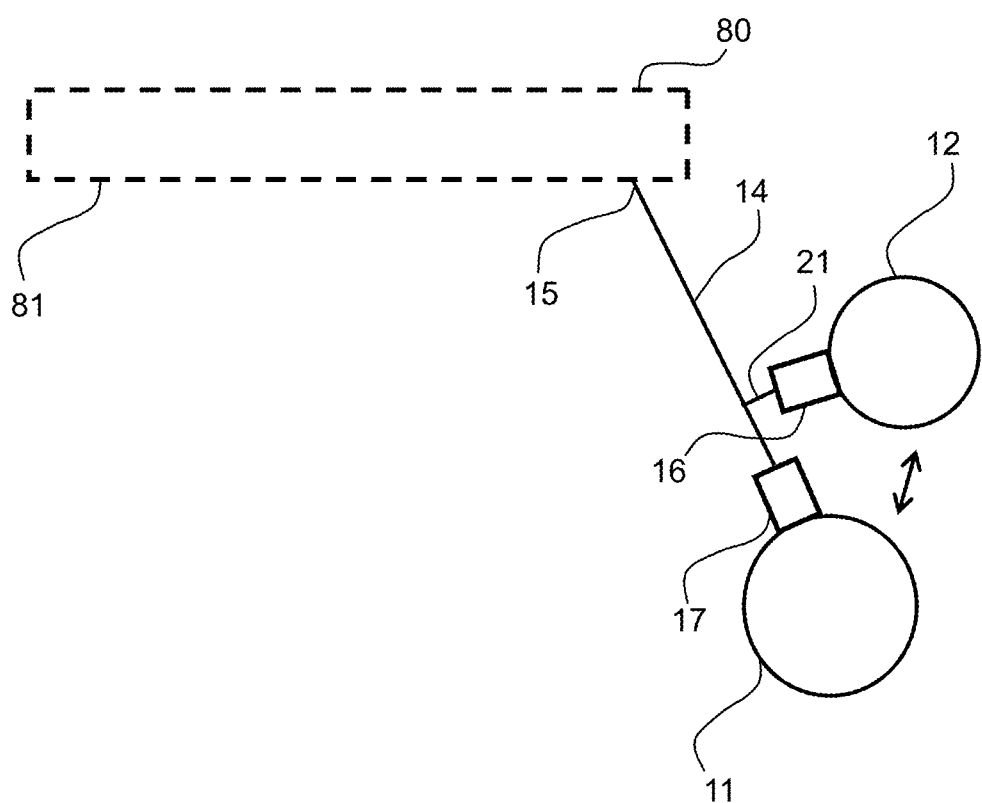

FIG. 4 schematically depicts a deployment device 20 according to the invention in the stowed configuration, during deployment and in the deployed configuration.

In the stowed configuration, the two instruments 11, 12 are one on the other and close to the face 81 of the supporting structure 80.

Once the satellite is in position for carrying out its mission, the deployment device 20 is activated in order to pass into its deployed configuration. The main motor 15 actuates the main arm 14 which is then moved relative to the supporting structure 80. The instruments 11, 12 are still in a mutually facing position.

In the deployed configuration, once the main arm 14 has reached its deployed position, the two instruments are moved relative to one another. The secondary motor 16 actuates the second instrument 12 and orients it into the desired position. At the end of deployment, that is to say in the deployed configuration, the two instruments 11, 12 are remote from one another and from the supporting structure 80.

There are two possible scenarios for the movement of the two instruments relative to one another. If one instrument, for example 11, is stowed on the instrument 12 with the active face of the instrument 11 facing the inactive face of the instrument 12 (in other words, the instrument 12 "has its back turned" to the instrument 11), then the secondary motor 16 can be configured to rotate the second instrument 12 about an axis essentially perpendicular to the main arm 14. The two instruments, thus in offset positions, face in the same direction.

If one instrument, for example 11, is stowed on the instrument 12 with the active face of the instrument 11 facing the active face of the instrument 12 (in other words, the instrument 12 is facing the instrument 11), then the secondary motor 16 is configured to rotate the second instrument about an axis located in one of the planes between the two instruments in the stowed position. The two instruments, thus in deployed positions, then face in the same direction. The same deployment takes place for the two instruments 11, 12 stowed with their inactive faces facing each other.

It is also possible to make the two instruments 11, 12 pass from the deployed position to the stowed configuration by proceeding inversely: the secondary motor 16 actuates the second instrument 12 to make it face the first instrument, and the main motor 15 actuates the main arm 14 to return it close to the face 81 of the supporting structure 80.

In another embodiment of the invention, the deployment mechanism 13 may comprise a secondary arm 21 connected to the main arm 14 at a second attachment point 22 on one hand and to the second instrument 12 on the other hand. The secondary arm 21 serves to determine the orientation of the second instrument 12 relative to the first instrument 11 and to the supporting structure 80.

Figure 5:
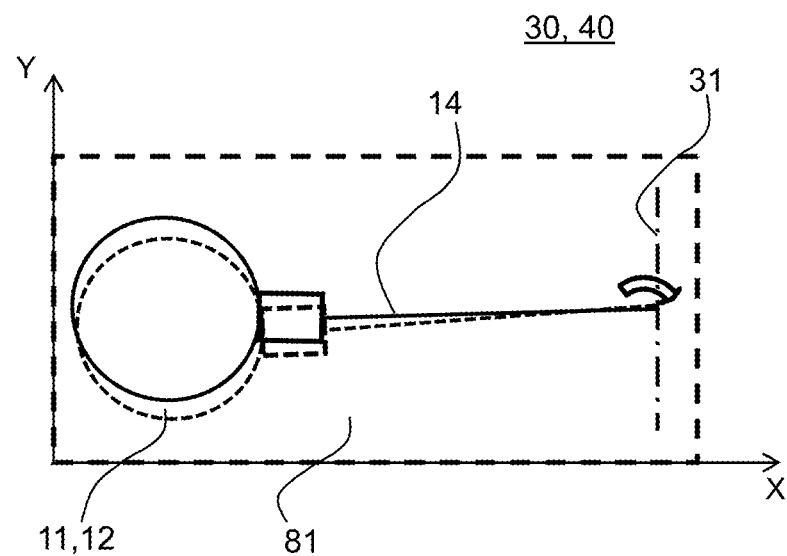

FIG. 5 schematically depicts a view from above of the face 81 of the supporting structure 80 on which rests an embodiment of the deployment device 40 according to the invention. As explained above, the main motor 15 is configured to actuate the main arm 14. Preferably, the actuation of the main arm 14 is in rotation relative to the face 81 of the supporting structure 80 about a main axis of rotation 31.

If the face 81 of the supporting structure 80 is defined as extending along a plane XY defined by a first axis X and by a second axis Y that is perpendicular or essentially perpendicular to the first axis X, the main axis 31 may be parallel to the plane XY, as shown in FIG. 5.

Figure 6:
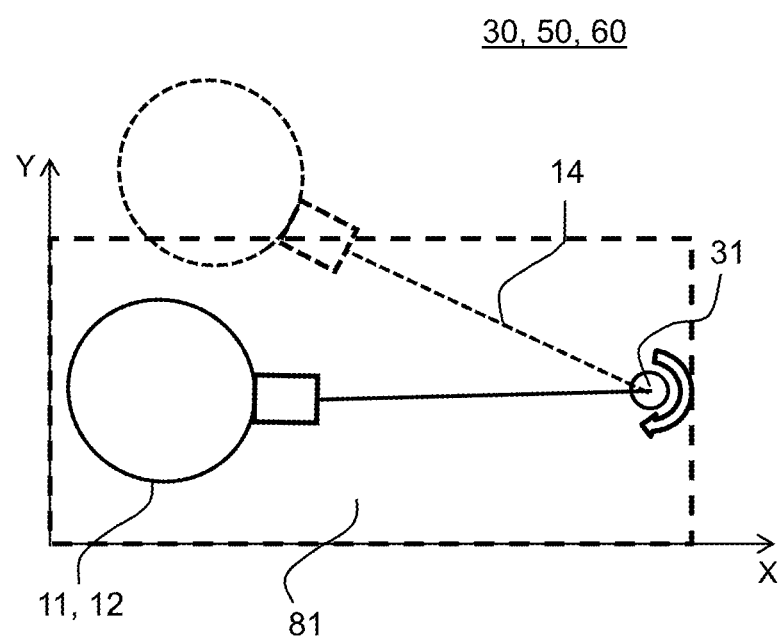

FIG. 6 schematically depicts a view from above of the face 81 of the supporting structure 80 on which rests another embodiment of the deployment device 30, 50, 60 according to the invention. In this embodiment, the main axis 31 may intersect the plane XY. In the other figures, the main axis 31 forms an angle with the face 81 in the deployed configuration, and this angle is between 20 and 40°, preferably approximately 30°. It can be perpendicular to the plane XY, that is to say at 90°, as depicted in FIG. 6.

Figure 7:
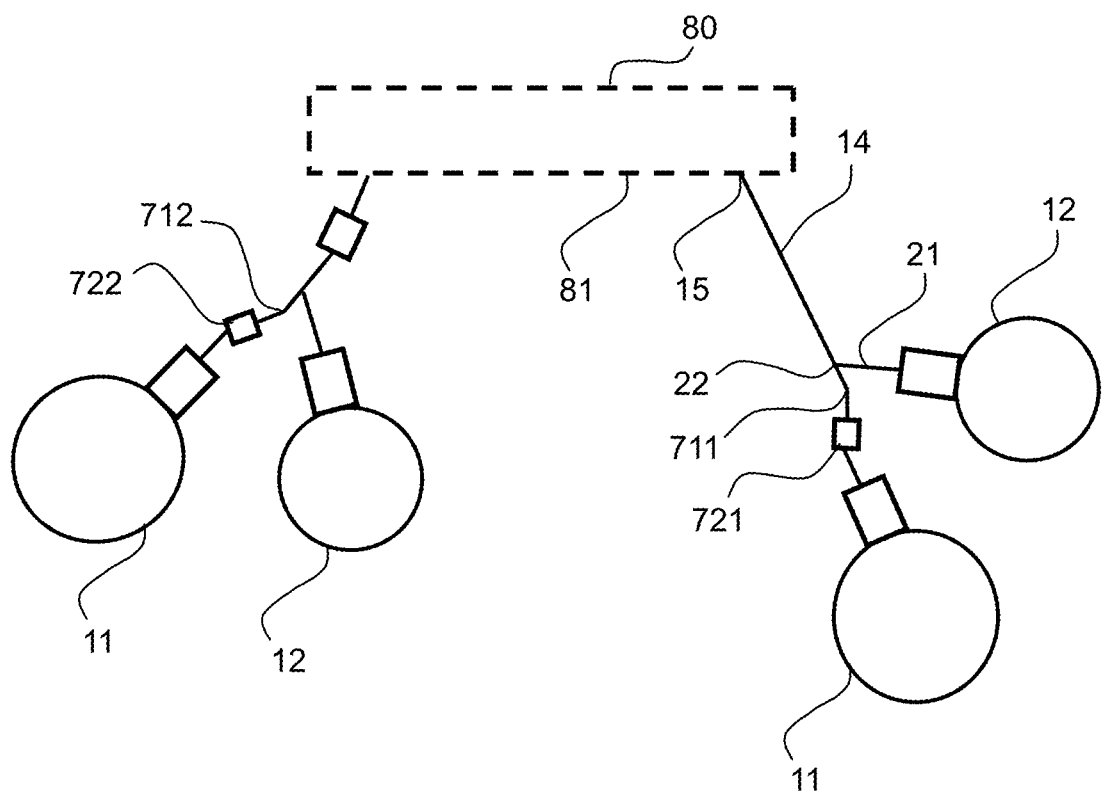

FIG. 7 schematically depicts another embodiment of a deployment device 70 according to the invention in the deployed configuration. At least one arm, that is to say the main arm 14 and/or the secondary arm 21, may be connected to the instrument 11 or respectively 12 to which the arm is connected by one or more arm sections 711, 712 and one or more motors 721, 722, each one associated with an arm section and configured to actuate the associated arm section, so as to position the instrument 11 or respectively 12 to which said arm is connected relative to the other of the two instruments. In the illustrated example, the main arm 14 of the deployment device positioned on the straight part of the satellite is connected to the instrument 11 by an arm section 711 and a motor 721 associated with the arm section 711 by means of which it is possible to actuate the arm section 711 to position the instrument 11 connected to the main arm 14.

On the same principle, the secondary arm 21 could be connected to the instrument 12 by another arm section 713 with a motor 723 (71N and 72N, N being equal to 3), to orient the instrument 12 connected to the secondary arm 21. Other arm sections can be envisaged. If an arm is connected for example by three arm sections to its instrument, then three other motors will be associated therewith.

N being an integer greater than or equal to 1, at least one of the arms 14, 21 may be connected to the instrument 11, 12 to which the arm is connected by N arm sections 71N and N motors 72N, each one associated with an arm section and configured to actuate the associated arm section, so as to position the instrument 11, 12 to which said arm is connected relative to the other of the two instruments.

Figure 8:
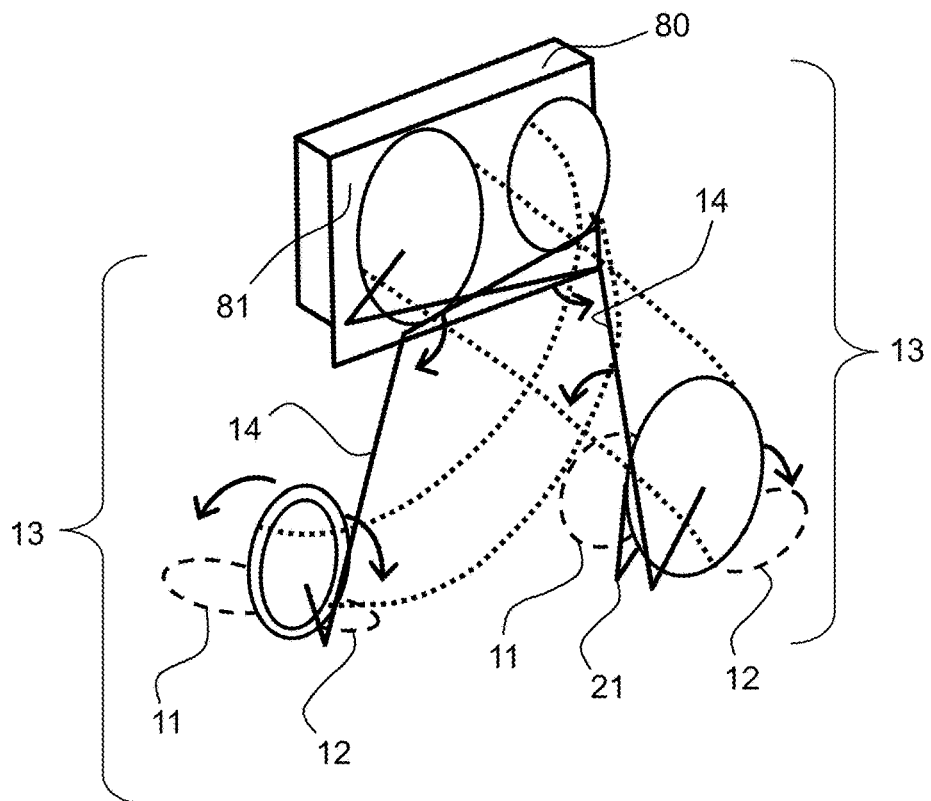

FIG. 8 schematically depicts a view of the deployment kinematics of two deployment devices according to the invention. Each device comprises a first instrument 11 and a second instrument 12 (as discussed above, it could comprise more than two instruments), a deployment mechanism 13 comprising the main arm 14 connected to the face 81 of the supporting structure 80 on one hand and to the first instrument 11 on the other hand, a main motor configured to actuate the main arm 14 relative to the face 81, and a secondary motor 16 configured to actuate the second instrument 12 relative to the main arm 14.

As it deploys, each deployment device follows a certain predefined trajectory and its elements (arms and instruments) occupy, during this trajectory, a certain volume that is also predefined. In order for the devices to deploy correctly without collision, the arms (main and secondary), the arm sections and the motors are positioned according to requirements and configuration constraints on a case-by-case basis.

The invention provides a solution by which it is possible to reduce, by a factor of 2, the number of arms and mechanisms on a satellite face. This solution also reduces the on-board mass and the cost in terms of equipment. Finally, the deployment of the two instruments at a distance from one another after the deployment of the main arm 14 at a distance from the supporting structure 80 brings about new possibilities in terms of configuration of antennas.

Figure 9:
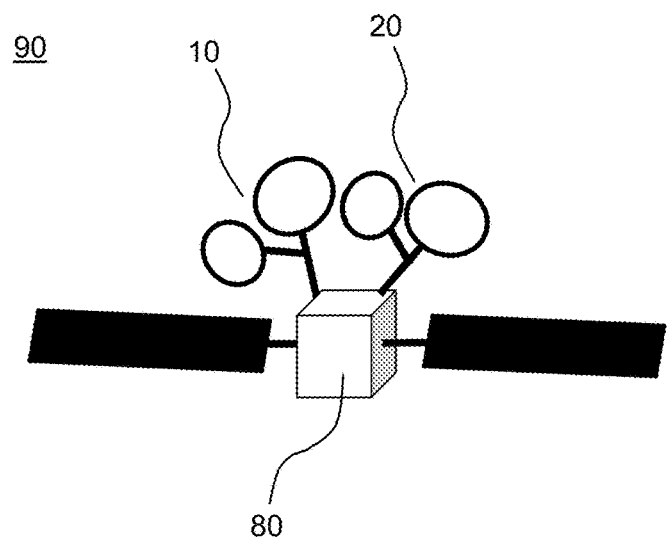

FIG. 9 schematically depicts a satellite 90 comprising at least one deployment device according to the invention. In FIG. 8, the satellite comprises two deployment devices 10, 20. It may comprise three or more thereof. The deployment devices may be mutually identical, or different, according to the variants presented above.

The devices depicted here comprise two antennas 11, 12, but each deployment device may comprise more than two instruments.

Finally, the deployment devices may be on a single face of the supporting structure 80 or else on different faces of the supporting structure 80 depending on the desired use of the instruments.

The invention claimed is:

1. A deployment device designed to be positioned on a supporting structure, comprising:
    a first instrument and a second instrument,
    a deployment mechanism comprising:
        a main arm formed in a single arm, a first end of the main arm is connected to a face of the supporting structure at a first attachment point and a second end of the main arm is connected to the first instrument, the second instrument being connected to the main arm between the first end and the second end of the main arm, a main motor positioned at the first end and configured to actuate the main arm relative to the face,
        a secondary motor positioned at the second end and configured to actuate the second instrument relative to the main arm,
    wherein the two instruments are able to pass from a) a stowed configuration, with one instrument superimposed on the other instrument, the two instruments stowed on the face of the supporting structure, to b) a deployed configuration wherein the two instruments are extended away from one another and from the supporting structure,
    wherein the deployment mechanism comprises a secondary arm directly connected to the main arm at a second attachment point on one end and to the second instrument.

2. The deployment device of claim 1, wherein the main motor is configured to actuate the main arm in rotation relative to the face of the supporting structure about a main axis of rotation.

3. The deployment device of claim 1, wherein the face of the supporting structure extends along a plane (XY) defined by a first axis (X) and by a second axis (Y) that is essentially perpendicular to the first axis (X), and comprises a main axis that is parallel to the plane (XY).

4. The deployment device of claim 1, wherein the face of the supporting structure extends along a plane (XY) defined by a first axis (X) and by a second axis (Y) that is essentially perpendicular to the first axis (X), and comprises a main axis that intersects the plane (XY).

5. The deployment device of claim 4, wherein the main axis is perpendicular to the plane (XY).

6. The deployment device of claim 1, N being an integer greater than or equal to 1, wherein and the secondary arm is connected to the instrument to which the secondary arm is connected by N arm sections and N motors, each motor associated with an arm section and configured to actuate the associated arm section, so as to position the instrument to which said secondary arm is connected relative to the other of the two instruments.

7. The deployment device of claim 1, wherein the instruments are antennas.

8. A satellite comprising at least one deployment device as claimed in claim 1.

9. The deployment device of claim 1, wherein the two instruments are able to further pass to an intermediate configuration between the stowed configuration and deployed configuration, wherein the secondary motor is configured to rotate the second instrument about an axis essentially perpendicular to the main arm so that the two instruments are in offset positions and assume an orientation wherein the two instruments face in the same direction.

10. The deployment device of claim 1, wherein the two instruments are able to further pass to an intermediate configuration between the stowed configuration and deployed configuration, wherein the secondary motor is configured to actuate the second instrument to assume an orientation wherein the second instrument faces the first instrument.

11. The deployment device of claim 1, the main motor is configured to actuate the main arm to return to the face of the supporting structure.

12. The deployment device of claim 1, wherein the secondary arm is configured to determine an orientation of the second instrument relative to the first instrument and to the supporting structure.

* * * * *